United States Patent [19]

Strudwick

[11] Patent Number: 4,766,163

[45] Date of Patent: Aug. 23, 1988

[54] MODIFIED POLYESTER THERMOSETTING RESIN COMPOSITIONS

[75] Inventor: Kenneth R. Strudwick, Adelaide, Australia

[73] Assignee: Bridges Corporation Pty Ltd, Australia

[21] Appl. No.: 931,465

[22] PCT Filed: Feb. 11, 1986

[86] PCT No.: PCT/AU86/00030

§ 371 Date: Oct. 10, 1986

§ 102(e) Date: Oct. 10, 1986

[87] PCT Pub. No.: WO86/04908

PCT Pub. Date: Aug. 28, 1986

[30] Foreign Application Priority Data

Feb. 13, 1985 [AU] Australia .............................. PG9263

[51] Int. Cl.[4] ............................................. C08L 67/06
[52] U.S. Cl. ..................................... 523/509; 523/500; 523/514; 523/516; 523/527; 524/39; 524/399; 524/431; 524/437; 524/513; 524/539
[58] Field of Search ................. 525/29, 446; 523/509, 523/516, 500, 527, 514; 524/39, 399, 437, 431, 513, 539

[56] References Cited

U.S. PATENT DOCUMENTS

| | | | |
|---|---|---|---|
| 2,937,230 | 5/1960 | Rogers | 525/445 |
| 3,919,438 | 11/1975 | Urkevich | 522/99 |
| 4,097,446 | 6/1978 | Abolins | 525/446 |
| 4,178,412 | 12/1979 | Sage | 428/391 |

OTHER PUBLICATIONS

Lubin, *Handbook of Composites*, pp. 19–37, Van Nostrand Reinhold Co., N.Y., 1982.

*Primary Examiner*—Patricia Short
*Attorney, Agent, or Firm*—Townsend and Townsend

[57] ABSTRACT

Thermosetting resin composition comprising an unsaturated thermosetting polyester resin and a thermosetting organo-silicone compound which can react with the thermosetting polyester resin by cross-linking to establish chemical bonds between the thermosetting polyester resin and the thermosetting organo-silicone compound for forming a solid polyester/organo-silicone thermoset resin product with a network of cross-linked chemical bonds. The thermosetting organo-silicone compound preferably is a thermosetting organo-silicone elastomer; the composition preferably contains a low-profile or low-shrinkage additive; and the polyester resin preferably is associated with an unsaturated monomer for cross-linking therewith. The resin composition is useful for the production of "dough" moulding compounds, sheet moulding compounds, bulk moulding compounds, high strength moulding compounds, and thick moulding compounds. Processes of injection moulding, compression moulding, transfer moulding, extruding and pultruding, are also provided.

32 Claims, No Drawings

MODIFIED POLYESTER THERMOSETTING RESIN COMPOSITIONS

BACKGROUND OF THE INVENTION

This invention provides polyester thermosetting resin compositions and products obtained from formulations containing such compositions, in which the polyester is chemically modified by reaction with organosilicone thermosetting compounds, in particular, organosilicone thermosetting elastomers.

More particularly, the invention provides polyester thermosetting resin "dough" moulding compositions wherein a "dough" comprising the chemically modified polyester thermosetting resin composition, catalyst, fillers and additives can be formed to shape in hot dies under high pressure, although in other embodiments the chemically modified polyester may include thermosetting resin compositions which are suitable for extruding, pultruding and hand lay-up processes and injection, compression and transfer moulding by appropriate changes therein.

In the past it has been suggested to add silicone prepolymers to certain thermoplastic materials and reference may be made to the publication "Plastics Technology", August 1985, pp 57–61. This publication describes the interpenetrating polymer networks which develop when a silicone prepolymer is admixed with a thermoplastic resin.

No prior art is known which describes the cross-linking by free radical or siloxane hydride to unsaturated bond reactions of heat-curable thermosetting organo-silicone compounds, in particular, organo-silicone thermosetting elastomer materials, into unsaturated polyester resins to form heat-curable cross-linked polyester thermosetting resins. By "thermosetting" is meant a polymeric composition capable of being cured or cross-linked so that it cannot be re-melted without destroying its chemical nature. Thermosets are characterized by the presence of extensive primary covalent bonds between molecules, in distinction to the weak secondary intermolecular forces characteristic of the re-meltable thermoplastic polymers.

SUMMARY OF THE INVENTION

In accordance with the present invention, there are provided new polyester thermosetting resins which can be used in moulding, extruding and pultruding processes, wherein an organo-silicone thermosetting compound, in particular, an organo-silicone thermosetting elastomer compound, is reacted with an unsaturated polyester resin, optionally with additives, leading to a new type of cross-linked polyester silicone polymer having many improved properties in the final product.

Thus, in contrast to the prior art, in which only interpenetrating networks were considered, which do not involve primary chemical bonds between cross-linked networks of a particular type (ie polymer A cross-links with polymer A and polymer B cross-links with polymer B, but not polymer A with polymer B; polymers A and B cross-link to form an intertwining and inextricable mixture), the present invention provides new polyester/organo-silicone thermosetting resins, in particular, organo-silicone thermosetting elastomer resin compositions in which the organo-silicone component actually cross-links by primary chemical bonds with the polyester resin, forming a solid polyester/silicone chemically cross-linked network.

Formulations comprising a polyester thermosetting resin, in particular, an organo-silicone thermosetting elastomer compound, catalyst (generally tertiary butyl perbenzoate), cellulose acetate butyrate or other appropriate low-profile or low-shrinkage additives, with fillers such as alumina trihydrate and fibre material, as well as mould release agents such as zinc stearate in appropriate proportions, can be cured together under heat and pressure to give products which are superior in quality to that formed in the absence of the silicone elastomer. Variations in the formulation lead to a variety of desirable properties and material that can be injection moulded, transfer moulded, compression moulded, extruded or pultruded.

Thus, the heat-cured thermoset polyester resin/thermoset organo-silicone compound, with or without the benefit of a low-profile or low-shrinkage additive and/or fillers, provides a complex interpenetrating molecular network containing primary chemical bonds between the organo-silicone compound and the polyester resin, which achieves physical characteristics in the products fabricated therefrom that are superior to products fabricated from the polyester resin without the presence of the organo-silicone compound. The invention has, for instance, important applications in the production of electrical insulating materials.

Moulding formulations in accordance with the invention, used for the production of moulded electrical insulating materials, have been found to provide general improvements in moulding operations and in the moulded products, for example: better mould release; improved water resistance; increased ultraviolet light protection; lower moulding pressures; lowered dust retention; improved chemical resistance; smoother mouldings; better colour distribution of pigment; and improved electrical properties. The invention may also be applied to such things as cookware; roofing materials; building materials; vehicle coachwork, running gear and fittings; and machine components and bodies.

GENERAL DISCUSSION

Polyester Resin Component

Polyester resins which can be used in preparing the resin compositions of the present invention are unsaturated thermoset synthetic resins formed by condensation reaction of anhydrides or carboxylic acids with alcohols; generally anhydrides or dicarboxylic acids with dihydroxy alcohols are used. The bond resulting from the condensation reaction is an ester bond ($RCO_2R'$). Generally the mixture is dissolved in an unsaturated monomer such as styrene, the unsaturated polyesters usually being cross-linked through their double bonds in the presence of a suitable unsaturated monomer. In the presence of catalysts, and generally of heat, the resins will cure to form a hard thermoset.

Polyester resins are formed from a variety of materials including maleic acid or anhydride, fumaric acid, phthalic acid or anhydride, or isophthalic acid, with alcohols such as ethylene glycol, propylene glycol, diethylene glycol and dipropylene glycol. The most common cross-linking agents are styrene and diallyl phthalate.

Peroxide catalysts such as benzoyl peroxide, methyl ethyl ketone peroxide, tertiary butyl perbenzoate and cumene hydroperoxide are usually added to the polyester resin to effect curing. A number of other peroxide catalysts such as cyclohexanone peroxide, 2,4-dichlorobenzoyl peroxide, bis-(para-bromobenzoyl)peroxide, and acetyl peroxide, are also used.

Polymerization inhibitors are added to polyester resins to prevent polymerization of the polyester resin at room temperature in the absence of catalysts. Some typically used inhibitors include hydroquinone, paratertiary-butyl-catechol, phenolic resins, aromatic amines, pyrogallol, chloranil, picric acid and quinones.

General literature references relevant to polyester resins which may be used in preparing resin compositions in accordance with the invention are The Condensed Chemical Dictionary (10th Ed.), G D Hawley (Reviser), Van Nostrand Reinhold (NY), 1981, p 830, and Encyclopaedia of Polymer Science and Technology, H F Mark, N G Gaylord, and N M Bikales (Eds), John Wiley and Sons, NY, 1969, Vol 11, p 62-168, the disclosures therein being incorporated herein by cross reference.

Polyester resins without a "low-profile" of "low shrinkage" additive, referred to hereinafter as being known in the art to alleviate the shrinkage and warping stresses created particularly in a polyester resin during curing, may be used in preparing resin compositions in accordance with the invention, but surface appearance and dimensional accuracy and mechanical strength may all be compromised to varying degrees. Hence it is preferred to utilise polyester resins containing a "low-profile" or "low shrinkage" additive as referred to hereinafter.

Commercially available polyester resins suitable for preparing "dough" and sheet moulding resin compositions in accordance with the invention are sold by Monsanto Australia Limited, Melbourne, Australia, a subsidiary of Monsanto Company, St Louis, Mo., USA, for example under the trade designation CRYSTIC D3679. This material is specially formulated to give consistent thickening with the thickening agents commonly used in "dough" moulding, such as magnesium oxide or hydroxide, and is frequently used without a "low profile" additive. When optimum surface finish is required, the material can be used with a "low" additive such as that sold by Monsanto Australia Limited under the trade designation LUSTREX 5300A. A typical formulation includes tertiary butyl perbenzoate, cellulose acetate butyrate, titanium pigment and alumina trihydrate, with glass or synthetic fibre being added for strength.

Other sources of suitable polyester resin are A C Hatrick Chemicals Pty Ltd, of Botany, New South Wales, Australia, who sells a moulding polyester resin under the trade designation POLYLITE, and Ashland Chemical Co, of Columbus, Ohio, USA, who sells an approximately equivalent resin under the trade designation AROPOL 7030. Still other supplies of suitable polyester resin products which function satisfactorily within this invention are available, the invention described below being satisfactorily workable with the polyester resins so identified and available from the specified suppliers.

Organo-Silicone Component

Thermosetting organo-silicone compounds which can be used in preparing the resin compositions of the present invention preferably are thermosetting organo-silicone elastomer materials based on a siloxane backbone containing organic functional groups:

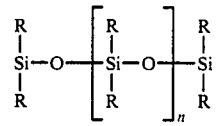

wherein n is an integer and R represents general organic groups and may include hydride, methyl and other alkyl compounds, amines, unsaturated groups (eg vinyls or acetylenes), alkyl halides, epoxides, phenyl and other aromatic compounds, with each R being the same or different; they can be either linear or branched chain siloxane polymers; and they are irreversibly cross-linked upon heating, in the presence of catalysts, to give a solid material.

The silicone elastomers can be cross-linked in a variety of ways including:

(i) Free-radical cross-linking

In the presence of specific organic peroxides (eg benzoyl peroxide or 2,4-dichlorobenzoyl peroxide), SiMe groups are converted to $SiCH_2$ free radicals which add to another free radical on a different polymer. For example:

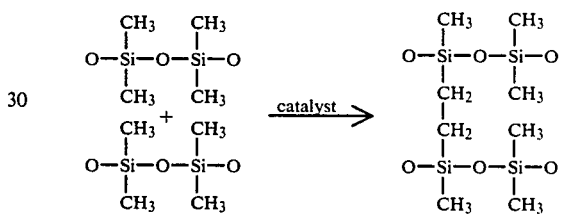

The $SiCH_2$ free radicals formed may also react with small unsaturated molecules often present in the reaction mixture, which can undergo a radical chain reaction. If the chain reaction is terminated by reaction with a $SiCH_2$ free radical of another siloxane polymer, an organic bridge is formed between the polymers.

(ii) Siloxane hydride cross-linking to unsaturated bonds

Siloxane hydrides (SiH) on the siloxane chain are activated in the presence of catalysts (generally $H_2PtCl_6$ is used) and heat. These materials react with unsaturated groups such as vinyls to form bridges between siloxane polymers.

The reaction is highly sensitive to temperature. These reactions can also proceed via small unsaturated organic molecules as described in (i).

(iii) Chemical reaction (ii) Reactive Species with Unsaturated Bond

Silicone elastomers are often supplied as a two-part mixture. Preferred organo-silicone compounds for use in preparing the resin compositions of this invention are two-part mixtures of silicone polymers which bond together on mixing and heat curing by reaction according to (ii) described above. A platinum catalyst, usually $H_2PtCl_6$, is present in one component. The major organic group present is methyl, but hydrides and terminal vinyls are also included. Fillers which may be used therein usually include silica, with other additives including inhibitors, pigments, and stabilisers, generally being present.

General literature references relevant to organo-silicone compounds which may be used in preparing resin compositions in accordance with the invention are Encyclopaedia of Chemical Technology (3rd Ed), H F Mark, D Othmer, C G Overberger, G T Seaborg, M Grayson and D Eckroth (Eds), John Wiley and Sons, NY, 1982, Vol 20, p 922–962, and Encyclopedia of Polymer Science and Technology, H F Mark, N G Gaylord, N M Bikales, (Eds), John Wiley and Sons, NY, 1970, Vol 12, p 464–569, the disclosures therein being incorporated herein by cross reference.

Commercially available thermosetting organo-silicone compounds suitable for use in preparing resin compositions in accordance with the invention are sold by General Electric Co, of USA, who manufacture a number of two-part heat-curing silicone elastomers under the trade designation LIM, one of which, the preferred material SLE5600, is primarily intended for use in injection moulding apparatus. Another source is the Dow Corning Co of Midlands, Mich., USA, who sells a generally equivalent silicone under the trade designation SILASTIC 591. Yet another source is Wacker-Chemie, of Munich, Western Germany, who sell a comparable silicone material under the trade designation VP-R 3003/50.

Silicone fluids, which are most commonly methyl substituted siloxanes, are not suitable for use in preparing resin compositions in accordance with the invention because: silicone fluids do not enter into reaction with the polyester resin; silicone fluids do not confer flexibility on moulded products; and silicone fluids largely migrate to the surface of the mould in producing moulded products.

Cross-Linking Reactions

Silicone polymers form primary chemical bonds with non-silicone species present in the reaction mixture when the appropriate functional groups and conditions are present. These functional groups include vinyl, silicon hydride

and silicon methyl

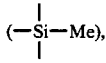

on the silicone polymer; and vinyl and other unsaturated groups on other species, in the present case, the polyester resin molecules. The conditions necessary for bonds to form include heat and the presence of appropriate catalysts such as $H_2PtCl_6$ or tertiary butyl perbenzoate.

The chemistry of the interactions of the organo-silicone polymer component with the polyester component is diverse and complex. Many functional groups are present which can interact with each other and lead to the formation of primary bonds between the organo-silicone compound and the polyester resin present. The interaction of the organo-silicone compound with the polyester resin molecule is of most importance to polyester "dough" moulding applications, with other beneficial interactions possibly also taking place between the silicone functional groups and non-resin ingredients.

Some of the principal interactions which are likely to take place are as follows:

(i) Reactive Species with unsaturated bond

Reactive Species are readily formed in the reaction mixtures and conditions described above in the presence of suitable catalysts (eg $H_2PtCl_6$ and tertiary butyl perbenzoate are common catalysts in the silicone/polyester mixtures herein). The free radicals formed (eg

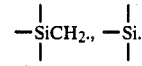

or RO· might be expected in a silicone/polyester mixture) may interact with an unsaturated bond (eg $RCH=CH_2$, $RCH=CHR'$ or $RC{\equiv}CH$ may be present—where R and R' represent some organic species) to form a new free radical species. This free radical species may interact with other unsaturated bonds, possibly undergoing a chain reaction. One of the free radical species formed may extract hydrogen (H·) from a donor molecule. By the reactions described, primary bonds are formed which can act as bridges between the silicone polymer and the polyester molecules in the mixture.

A possible bridge between a silicone molecule and a polyester resin molecule may be of the form

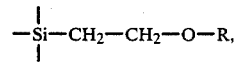

wherein R represents the polyester resin material, and

represents a silicone atom from the organo-silicone compound.

(ii) Free radical with free radical

Some of the free radical species described in (i) above, or other free radicals species present in the reaction mixture, may interact with each other to form a primary bond between them. By this means, a bridge may form between the silicone polymer and the polyester resin material. The reaction type is shown by the general equation

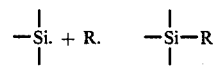

whilst a bridge between a silicone free radical molecule and other radicals present in the polyester resin may be of the form:

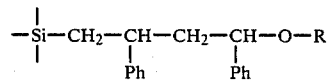

wherein R represents the polyester resin material, and

represents a silicone atom from the organo-silicone compound.

In this invention the mechanism of cross-linking does not involve a condensation reaction such as:

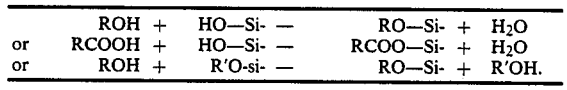

Polyester/Silicone Cross-Linked Thermoset Resin

The polyester/silicone cross-linked resin compositions of the present invention contain adequate amounts of multi-functional units between which the cohesive forces are insufficient to prevent flow, the addition of curing agents and application of heat causing irreversible hardening of the compositions into thermoset solids, through cross-linking chemical bonds being formed so that flow is no longer possible.

These characteristics are consistent with the definition of thermoset resins according to literature references such as Encyclopaedia of Chemical Technology (3rd Edition), H F Mark, D F Othmer, C G Overberger, G T Seaborg, M Grayson and D Eckroth (Eds), John Wiley and Sons, NY, 1979, Vol 8, p 885, ibid, 1980, Vol 9, p 133; The Condensed Chemical Dictionary (10th Edition), G G Hawley (reviser), Van Nostrand Reinhold, NY, 1981, p 1016; and Plastics Engineering Handbook, (4th Edition) J Frados (Ed), Van Nostrand Reinhold, NY, 1976, p 204–205, the disclosures therein being incorporated herein by cross reference.

The curing polymerization is generally dependent on time and temperature but the nature of the curing agent is also an important consideration. The formulations become more liquid initially and then set hard when polymerization is complete. If moulding is carried out under pressure, the resulting material is a dense solid.

Various degrees of rigidity and flexibility can be achieved in the end products by modifying the polyester/organo-silicone thermosetting resin formulations of the invention. These materials can be adjusted to provide products having flexibilities close to those of elastomeric materials. The inclusion of a wide range of filler materials assist in achieving such variations, suitable filler materials including alumina, woodflour, cement, macerated rag, glass, natural or synthetic fibres, mica and other minerals.

Low Profile Additive

Low profile additives are polymers which can be added to uncured thermoset material to fill any surface imperfections resulting from shrinkage of the resin material during the curing and moulding process. Low profile additives are chosen to be incompatible with the cured product and are designed not to cross-link with the prepolymer. Thus, powdered polyethylene is added as a low profile additive to polyester resins to fill surface imperfections resulting from shrinkage.

General literature references relevant to low profile additives which may be used in the resin compositions of the present invention are Encyclopedia of Polymer Science and Engineering (2nd Edition), H F Mark, N M Bikales, C G Overberger, G Menges, J I Kroschwitz (Eds), J Wiley & Sons, NY 1985, Vol 1, p 474, and Encyclopedia of Chemical Processing and Design, J J McKetta and W A Cunningham (Eds), Marcel Dekker (NY), 1977, Vol 2, p 109, the disclosures therein being incorporated herein by cross reference.

Commercially available low profile additives which may be so used, can be detailed as follows:

| Supplier | Trade Designation | Basis |
|---|---|---|
| Monsanto | LUSTREX 5300A | polystyrene |
| Rohm & Haas | PARAPLEX P19 | acrylic |
| Union Carbide | LP-40A,LP-100,LP-30 LP-85,LP-90 | polyvinyl-acetate |
| Union Carbide | LP-60, LPS-60 | polycaprolactone |
| Union Carbide | LP-80, LPS-80 | polystyrene |
| Union Carbide | LP-33 | vinyl acetate/vinyl chloride copolymer |
| Eastman-Kodak | — | cellulose acetate butyrate |
| Labfina | FINAPRENE | styrene butadiene elastomer |
| Allied Chemical | AC POLYMIST | polyethylene |

Low profile additives are considered to have a functionally different role from that of the organo-silicone compound, whose role is to cross-link with the polyester in forming a thermoset resin of the invention. Sometimes a low profile additive may contain functional groups which will react with the organo-silicone compound and cause it to cross-link therewith, however, this would be an unusual event, as low profile additives are chosen generally so as to be unreactive.

PREFERRED EMBODIMENTS OF THE INVENTION

A cured "dough" moulding formulation embodying the polyester/silicone cross-linked prepolymers in accordance with the foregoing, which prepolymers can be thermoset, constitute a preferred embodiment of the invention. Thermosets are useful as insulators in electric/electronic applications due to their ability to resist heat and environmental conditions. Some of the distinctive properties of thermosets include dimensional stability, low-to-zero creep, low water absorption, maximum physical strength, good electrical properties, high heat deflection temperatures, high heat resistance, minimal values of coefficient of thermal expansion, and low heat transfer.

A cured "dough" moulding formulation is an aggregate material consisting of a glass-like resin matrix heavily filled with reinforcing powders and fibres whose material properties are complementary to those of the resin. The resultant heterogenous composition may thus be usefully formulated so that it has properties superior to any of its parts. Fibre reinforcement principally contributes to the development of tensile strength, and the prevention of brittle fracture propagation. Powder fillers are typically chosen to decrease flammability, brittleness and cost.

Cured "dough" moulding formulations embodying the polyester/silicone cross-linked resins in accordance with the invention, fulfill many of the criteria required of insulating material to be used by the electrical industry, with respect to ultraviolet resistance, weathering resistance, resistance to water absorption, resistance to degradation by heat, and resistance to corrosive weathering (whose breakdown products result in "tracking"

currents occurring across the insulator), and high edge-to-edge breakdown voltage characteristics.

Preferred moulding formulations according to the invention contain the organo-silicone compound in the range on total formulae weight of from about 0.1% to about 30%, the preferred range for "dough" moulding formulations being about 0.5% to about 15% (expressed as a percentage of the total mixture by weight). Most preferred formulations contain mixtures of organo-silicone compound:polyester resin in the ratio of about 3:10, respectively, based on the weight of the components.

Ranges of other materials in the formulations may be as follows: polyester resin 5–95% wt; low profile additive 0–30% wt; catalyst 0.01–2% wt; filler 0–70% wt; release agent 0–10% wt; pigment 0–70% wt; and fibres 0–80% wt. Preferred ranges of such other materials in the "dough" moulding compound are as follows: polyester resin 21–28% wt; low profile additive 3–14% wt; catalyst 0.30–0.42% wt; filler 41–58% wt; pigment 1–12% wt; release agent 0.1–1.5% wt; and fibres 10–26% wt (expressed as a percentage by weight of the total mixture).

Preferred polyester resins for use in the resin compositions of the invention are Monsanto D3679, or Ashlands 7030, or AC Hatrick POLYLITE 61.020 or 07512. Preferred low profile additives for use with organo-silicone compounds used in the compositions of the invention are thermoplastic vinyl acetates, acrylics, and cellulose acetate butyrates, whilst the least preferred are thermoplastic rubbers, polystyrene, polyethylene or polypropylene.

A preferred formulation for a "dough" moulding composition consists of the following materials:

| Component | Parts by Wt |
| --- | --- |
| D3679 | 340 |
| CAB Solution | 113 (30% in styrene monomer) |
| TBP | 005 |
| A | 050 |
| B | 050 |
| ZnSt | 020 |
| TiO2 | 003 |
| ATH 10 | 500 |
| ATH 20 | 333 |
| Glass | 266 |

Legend
D3679 = polyester resin made by Monsanto
CAB = cellulose acetate butyrate (low profile additive)
TBP = tertiary butyl perbenzoate (catalyst for curing polyester resin)
A = component A of the silicone elastomer mix
B = component B of the silicone elastomer mix
ZnSt = zinc stearate
TiO$_2$ = white pigment - titanium oxide
ATH10 = alumina trihydrate - filler and heat sink (10 micron mean particle size)
ATH20 = alumina trihydrate - filler and heat sink (20 micron mean particle size)
Glass = reinforcing material (6 mm chopped strand).

This formulation gives an excellent solid material for use as an insulator of electricity and heat (eg for use in meter boards, switch boards, sewerage vent caps, machine components, building materials).

The following table gives the percentages by weight of the various components in typical "dough" moulding mixtures:

TABLE

| | Col. 1 | Col. 2 | Col. 3 | Col. 4 | Col. 5 |
| --- | --- | --- | --- | --- | --- |
| D3679 | 21.091% | 20.923% | 19.883% | 17.801% | 15.384% |
| CAB | 7.009 | 6.953 | 6.608 | 5.916 | 5.113 |
| TBP catalyst | 0.310 | 0.307 | 0.292 | 0.261 | 0.226 |
| A (silicone) | 0.062 | 0.307 | 2.932 | 7.853 | 13.574 |
| B (silicone) | 0.062 | 0.307 | 2.932 | 7.853 | 13.574 |
| Zinc Stearate | 1.240 | 1.230 | 1.169 | 1.047 | 0.904 |
| Titanium Oxide Pigment | 2.047 | 2.030 | 1.929 | 1.727 | 1.493 |
| 10 Alumina | 31.017 | 30.769 | 29.239 | 26.178 | 22.624 |
| 20 Alumina | 20.657 | 20.492 | 19.473 | 17.434 | 15.067 |
| Glass | 16.501 | 16.369 | 15.555 | 13.926 | 12.036 |

All components but the silicone elastomers comprise 1610 parts of the mixture by weight and are not varied.

| | | |
| --- | --- | --- |
| Column 1 | 1 part silicone A | (0.062%) |
| | 1 part silicone B | (0.062%) |
| | 1610 parts other components | |
| Column 2 | 5 parts silicone A | (0.307%) |
| | 5 parts silicone B | (0.307%) |
| | 1610 parts other components | |
| Column 3 | 50 parts silicone A | (2.932%) |
| | 50 parts silicone B | (2.932%) |
| | 1610 parts other components. | |
| Column 4 | 150 parts silicone A | (7.853%) |
| | 150 parts silicone B | (7.853%) |
| | 1610 parts other components. | |
| Column 5 | 300 parts silicone A | (13.574%) |
| | 300 parts silicone B | (13.574%) |
| | 1610 parts other components. | |

The range of silicone elastomer thus being 0.06% to 13.5% wt.

A "dough" moulding composition in accordance with the invention may be prepared by carrying out the following steps:

(1) polyester resin (51 kg) is placed in a double blade mixer and all other materials are mixed in order as follows:

(2) low profile resin (16.95 kg) is mixed in for 5 mins;

(3) silicone A (7.5 kg) and silicone B (7.5 kg) are mixed in for 10 mins with TBP catalyst (0.25 kg); then (4) release agent (3 kg), TiO$_2$ (4.95 kg), and colour as required are mixed in for 3 mins; then (5) alumina ATH10 (75 kg) and ATH20 (49.95 kg) are mixed in for 5 mins; then (6) glass (3.99 kg) is mixed in for 3 mins. The above mixture is then discharged into containers and is ready for moulding.

Hot compression moulding may be carried out as follows:

(A) the "dough" is placed in a mould which is heated 120°–160° C.;

(B) the mould is closed and pressure applied from 250–1000 psi for 20 sec/1 mm of moulded part thickness; and (C) upon completion of the cure, the moulded part is removed from the mould. Inclusion of the organo-silicone component in the moulding composition aids in release of the moulded part from the mould, whilst upon cooling the organo-silicone component helps to minimise warpage of the molded part.

Injection moulding may be carried out as follows:

(A) the "dough" is placed in the plunger;

(B) the "dough" is forced into cavity of the injection moulding die which is heated at 120° C.–160° C., the injection pressure being 700–1700 psi, clamp pressure 400 tons;

(C) the mould is cured for 20 sec/1 mm of part thickness; and (D) upon completion of the cure, the moulded part is removed from the mould.

PRACTICAL EXAMPLES

EXAMPLE 1

In a first embodiment, a silicone pre-mix was made of equal parts of the A and B components of the aforementioned Dow Corning SILASTIC 591. A fibre glass reinforced polyester formulation was made up with Monsanto CRYSTIC D3679 polyester resin to which was added the Silicone A and B premix, the tertiary butyl perbenzoate catalyst, the low profile additive cellulose acetate butyrate (CAB), zinc stearate mould release, titanium dioxide pigment, alumina trihydrate in two particle sizes, and 6 millimeter glass fibres. The formulation is one which is preferred in the production of electrical insulating panels and insulators:

|  | Parts by Wt |
|---|---|
| Monsanto CRYSTIC D3679 | 340 |
| Tertiary Butyl Perbenzoate | 5 |
| Cellulose Acetate Butyrate (30% solution by weight in styrene monomer) | 113 |
| Silicone A + B premix | 100 |
| Zinc Stearate | 20 |
| Titanium Dioxide | 33 |
| Alumina Trihydrate (10 micron mean particle size) | 333 |
| Alumina Trihydrate (20 micron mean particle size) | 500 |
| Glass Fibers 6 mm | 166 |

After maturation for several days, the above material has thickened sufficiently to allow easy handling and good moulding. The "dough" moulding material can be placed in a cavity die heated to 90°–160° C. (preferred 145° C.) for about 90 seconds (for 6 mm part thickness). The product is then ejected from the mould and continues to cure for a short period of time.

Tests have established that a number of desirable properties of the moulded material are upgraded by the addition of the organo-silicone material to the polyester material as follows:

(i) resistance to ultraviolet radiation is improved;

(ii) resistance to weathering and water absorption is improved;

(iii) charring and discolouration with heat is improved, for example, in a glow-wire penetration test;

(iv) electrical insulation is improved, as indicated by an electrical flashover test;

(v) impact strength is improved;

(vi) dirt pickup and surface current tracking is reduced, even in corrosive environments, such as those specified under IEC publication 112 as a Taber index test;

(vii) the surface finish is found to be much improved, probably because the glass fibre reinforcement appears not to be clumped at the surface;

(viii) surface gloss is improved;

(ix) the surface is rich in silicone and consequently has a low coefficient of friction and improved wearing properties;

(x) the addition of the silicone renders the polyester material of Example 1 above, almost completely insoluble in strong alkaline solutions such as sodium hydroxide;

(xi) there is greatly improved pigmentation in the "dough" mouldings with deeper colours possible without the pronounced mottling typical of "dough" mouldings modified with low profile additive but no additional silicone;

(xii) the moulded part shows less tendency to warp than a moulded part without the silicone;

(xiii) demoulding (separation from the mould) is easier because there is less adhesion to the die;

(xiv) lower moulding pressures are required, so that die and press wear may be expected to be reduced; and (xv) improved flow properties when moulding.

Listed below are the results of a comparison, in which A=best and C=worst, that has been made between; a conventional ABS (acrylonitrile-butadiene-styrene copolymer) thermoplastic product; a conventional "dough" moulding (DMS) thermoset product; and the "dough" moulding (DMC) product obtained in accordance with Example 1, with respect to economics, environmental effects, thermal effects, mechanical properties, and electrical characteristics.

|  | Conventional ABS Product | Conventional DMC Product | DMC Product of Example 1 |
|---|---|---|---|
| ECONOMICS | | | |
| Material Costs | C | A | A |
| Fabricating and finishing costs | A | C | C |
| ENVIRONMENTAL | | | |
| Influence of temperature on all properties | C | A | A |
| Ageing due to light and heat | C | B | A |
| Weathering | C | B | A |
| Influence of humidity on creep and electrical properties | A | A | A |
| Chemical attack | C | B | A |
| Flammability | C | B | A |
| THERMAL | | | |
| Heat shrinkage from mould | C | B | A |
| Thermal expansion | C | A | A |
| Specific heat | Low | High | High |
| Dimensional stability | C | A | A |
| Upper and lower temperatures | C | A | A |
| Colors possible | A | C | B |
| Optical clarity | A | C | C |
| Surface-finishes possible | A | A | A |
| MECHANICAL | | | |
| Mechanical resistance to rupture, fatigue, and ductile-brittle transitions | C | A | A |
| Creep at temperature and stress level | C | A | A |
| Stress relaxation at various temperatures, frequencies and stress levels | C | A | A |
| Tensile and compressive strength | C | A | A |
| Creep rupture at various temperatures | C | A | A |
| Impact strength: notch sensitvity, effect of surface finish, temperature dependence | C | C | C |
| Dynamic fatigue at various temperatures, | C | A | A |

| | Conventional ABS Product | Conventional DMC Product | DMC Product of Example 1 |
|---|---|---|---|
| frequencies, and stress levels | | | |
| Effect of processing conditions on stiffness and strength | C | A | A |

ELECTRICAL CHARACTERISTICS

Marked improvements were noted in the following electrical characteristics of the "dough" moulding thermoset product of Example 1:

(a) Tracking resistance;
(b) Volume and surface resistivity;
(c) Dielectric constant (over a range of frequencies); and
(d) Loss tangent (over a range of frequencies).

EXAMPLE 2

Low voltage electrical insulators for use on power transmission lines can be injection moulded using the formulation given in Example 1, but with a 6 mm glass fibre content of 150 parts. The formulation is otherwise unchanged.

EXAMPLE 3

Microwave and oven cookware can be manufactured using a formulation of polyester resin, silicone A and B, tertiary butyl perbenzoate, CAB and other additives in the proportions detailed below. The use of silicone A and B in this formulation gives the advantages of even colour distribution, non-stick properties, improved impact resistance and improved heat insulation.

| | Parts by Wt. |
|---|---|
| Monsanto CRYSTIC D3679 | 340 |
| Tertiary Butyl Perbenzoate | 5 |
| Cellulose Acetate Butyrate (30% solution by weight in styrene monomer) | 113 |
| Silicone A | 25 |
| Silicone B | 25 |
| Zinc stearate | 20 |
| Alumina Trihydrate (0.5 micron mean particle size) | 540 |
| Glass Fibers 6 mm | 266 |

The dough formed can be injection or compression moulded at 145° C. for about 90 sec (20 sec/mm part thickness). A possible temperature range of 90°–160° C. can be used.

Increasing the pressure or temperature during moulding with the present invention facilitates the production of superior mouldings. It may be noted that the pressure can be reduced by between 25 and 50% from that required to effect "dough" moulding without the use of the silicone component, and that the improved flow in the uncured moulding composition makes possible the moulding of intricate shapes which otherwise might not be possible with moulding techniques.

The beneficial results achieved by the present invention are believed to be due to the following phenomena:

(1) the degree of interpenetrating cross-linked network structure within the cured products obtained from the resin compositions according to the invention, essentially derived through the cross-linking reaction of the polyester component with the organo-silicone component;

(2) the ability to control migration of the organo-silicone component to the surface of the cured product, by pre-reaction of the organo-silicone component with the polyester resin binding the two polymers together, so that the mixture releases less organo-silicone material to the surface upon curing, if this is desired;

(3) the toughness imparted to the cured product by the inherent resilience of the organo-silicone component;

(4) the facility for the organo-silicone compound to migrate to the surface and provide excellent surface finish to the cured product; and (5) the ability of organo-silicone component to carry pigment to the surface of the thermoset resin (this overcomes the problem of colour mottling often observed due to the presence of low profile additives).

I claim:

1. A thermosetting resin prepolymer composition comprising an unsaturated thermosetting polyester resin reacted with a thermosetting organo-silicone compound based on a siloxane backbone containing organic functional groups:

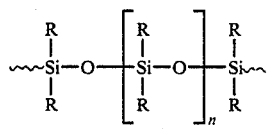

wherein n is an integer and R is a hydride, alkyl group, amine, unsaturated group, alkyl halide, epoxide, or aromatic group and each R being the same or different, in a non-condensation reaction in the presence of a catalyst by cross-linking to establish chemical bonds between the thermosetting polyester resin and the thermosetting organo-silicone compound.

2. A thermosetting resin prepolymer composition according to claim 1 wherein the thermosetting organo-silicone compound is a thermosetting organo-silicone elastomer.

3. A thermosetting resin prepolymer composition according to claim 1 further containing an unsaturated monomer for cross-linking with the thermosetting polyester resin.

4. A thermosetting resin prepolymer composition according to claim 1 further containing cellulose acetate butyrate low-profile additives.

5. A thermosetting resin prepolymer composition according to claim 1 wherein said free radical generating catalyst is tertiary butyl perbenzoate.

6. A thermosetting resin prepolymer composition according to claim 1 containing fillers.

7. A thermosetting resin prepolymer composition according to claim 1 containing reinforcing fibres.

8. A thermosetting resin prepolymer composition according to claim 1 containing pigments.

9. A thermosetting resin prepolymer composition according to claim 1 containing mould release agents.

10. A thermosetting resin prepolymer composition according to claim 1 containing organo-silicone compounds in the range of from about 0.1% to about 30% based on the weight of the composition.

11. A thermosetting resin prepolymer composition according to claim 10 wherein the organo-silicone compound is present in the range of from about 0.5% to about 15% based on the weight of the composition.

12. A thermosetting resin prepolymer composition according to claim 1 containing thermosetting polyester resin: thermosetting organo-silicone compound in the ratio of about 3:10, respectively, based on the weight of the components.

13. A thermosetting resin prepolymer composition according to claim 1 comprising: thermosetting polyester resin in the range of 5–95%; low profile additive in the range of 0–30%; catalyst in the range of 0.01–2%; filler in the range of 0–70%; fibres in the range of 0–80%; pigment in the range of 0–70%; and release agent in the range of 0–10%, each percentage based on the weight of the composition.

14. A thermosetting resin prepolymer composition according to claim 13 wherein the thermosetting polyester resin is in the range of 21–28%; the low profile or low shrinkage additive is in the range of 3–14%; the catalyst in in the range of 0.30–0.42%; the filler is in the range of 41–58%; the fibres are in the range of 10–26%; the pigment is in the range of 1–12%; and the release agent is in the range of 0.1–1.5%, each percentage based on the weight of the composition.

15. A process for the production of moulded articles comprising the step of subjecting a thermosetting resin prepolymer composition to hot compression moulding or injection moulding or extrusion or pultrusion, wherein the thermosetting resin prepolymer composition is prepared by reacting an unsaturated thermosetting polyester resin with a thermosetting organo-silicone compound based on a siloxane backbone containing organic functional groups:

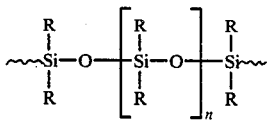

wherein n is an integer and R is a hydride, alkyl group, amine, unsaturated group, alkyl halide, epoxide, or aromatic group and each R being the same or different, in a non-condensation reaction in the presence of a catalyst by cross-linking to establish chemical bonds between the thermosetting polyester resin and the thermosetting organo-silicone compound.

16. A process according to claim 15 wherein the thermosetting organo-silicone compound in the thermosetting resin prepolymer composition is a thermosetting organo-silicone elastomer.

17. A process according to claim 15 further comprising adding to said thermosetting resin prepolymer composition an unsaturated monomer for cross-linking with the thermosetting polyester resin.

18. A process according to claim 15 further comprising adding cellulose acetate butyrate low-profile additive to the thermosetting resin prepolymer composition.

19. A process according to claim 15 wherein said free radical generating catalyst is tertiary butyl perbenzoate.

20. A process according to claim 15 further comprising adding alumina trihydrate to the thermosetting resin prepolymer composition.

21. A process according to claim 15 further comprising adding reinforcing glass fibres to the thermosetting resin prepolymer composition.

22. A process according to claim 15 further comprising adding titanium dioxide pigment to the thermosetting resin prepolymer composition.

23. A process according to claim 15 further comprising adding zinc stearate release agents to the thermosetting resin prepolymer composition.

24. A process according to claim 15 wherein the thermosetting resin prepolymer composition contains organo-silicone compound in the range of from about 0.1% to about 30% based on the weight of the composition.

25. A process according to claim 24 wherein the organo-silicone compound is present in the range of from about 0.5% to about 15.0% based on the weight of the composition.

26. A process according to claim 15 wherein the thermosetting resin prepolymer composition contains thermosetting polyester resin: thermosetting organo-silicone compound in the ratio of about 3:10, respectively, based on the weight of the components.

27. A process according to claim 15 further comprising adding the following to the thermosetting resin prepolymer: thermosetting polyester resin in the range of 5–95%; low shrinkage additive in the range of 0–30%; catalyst in the range of 0.01–2%; filler in the range of 0–70%; fibres in the range of 0–80%; pigment in the range of 0–70%; and release agent in the range of 0–10%, each percentage based on the weight of the composition.

28. A process according to claim 27 wherein the thermosetting polyester resin prepolymer is in the range of 21–28%; the low profile, low shrinkage additive is in the range of 3–14%; the catalyst is in the range of 0.30–0.42%; the filler is in the range of 41–58%; the fibres are in the range of 10–26%; the pigment is in the range of 1–12%; and the release agent is in the range of 0.1–1.5%, each percentage based on the weight of the composition.

29. A thermosetting resin prepolymer according to claim 1 wherein said polyester resin and organo-silicone compound react further in the presence of a siloxane hydride activating catalyst.

30. A thermosetting resin prepolymer according to claim 29 wherein the thermosetting organo-silicone compound is a thermosetting organo-silicone elastomer.

31. A thermosetting resin prepolymer according to claim 29 containing reinforcing fibres.

32. A process for the production of moulded articles according to claim 15 further comprising effecting said reaction in the presence of a siloxane hydride activating catalyst.

* * * * *